United States Patent
Zhou et al.

(10) Patent No.: US 10,691,290 B2
(45) Date of Patent: Jun. 23, 2020

(54) VIRTUAL-REALITY BASED CONTROL METHOD AND APPARATUS

(71) Applicant: TENCENT TECHNOLOGY (SHENZHEN) COMPANY LIMITED, Shenzhen, Guangdong (CN)

(72) Inventors: Yang Zhou, Shenzhen (CN); Chen Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/263,289

(22) Filed: Jan. 31, 2019

(65) Prior Publication Data
US 2019/0171346 A1 Jun. 6, 2019

Related U.S. Application Data
(63) Continuation of application No. PCT/CN2017/107262, filed on Oct. 23, 2017.

(30) Foreign Application Priority Data
Nov. 3, 2016 (CN) .......................... 2016 1 0974040

(51) Int. Cl.
*G06F 3/0481* (2013.01)
*G06T 19/00* (2011.01)
(Continued)

(52) U.S. Cl.
CPC .......... *G06F 3/04815* (2013.01); *G06F 3/011* (2013.01); *G06F 9/451* (2018.02); *G06T 19/006* (2013.01); *G06F 2203/012* (2013.01)

(58) Field of Classification Search
CPC ....... G06T 19/006; G06T 13/00; G06T 13/20; G06T 13/40; G06F 3/011; G06F 3/04815
See application file for complete search history.

(56) References Cited

U.S. PATENT DOCUMENTS 5,736,982 A * 4/1998 Suzuki .................. G06T 15/30
348/E7.083
10,115,149 B1 * 10/2018 Deem .................. G06T 19/006
(Continued)

FOREIGN PATENT DOCUMENTS

| CN | 103812931 A | 5/2014 |
|---|---|---|
| CN | 105224179 A | 1/2016 |

(Continued)

OTHER PUBLICATIONS

Communication dated Mar. 5, 2019, from the State Intellectual Property Office of the P.R.C in counterpart application No. 201610974040.5.
(Continued)

*Primary Examiner* — Daniel F Hajnik
(74) *Attorney, Agent, or Firm* — Sughrue Mion, PLLC

(57) ABSTRACT

A virtual-reality-based control method and apparatus are disclosed. In the method, a moving instruction initiated by a first object located in a virtual reality scene is detected and a moving request is transmitted to a server based on the moving instruction. A movable area is received from the server in response to the moving request, wherein the movable area does not overlap with a safe area of a second object, the second object being an object other than the first object in the virtual reality scene. The first object is prompted to move within the movable area.

17 Claims, 9 Drawing Sheets

(51) Int. Cl.
*G06F 3/01* (2006.01)
*G06F 9/451* (2018.01)

(56) References Cited

U.S. PATENT DOCUMENTS

| | | | | |
|---|---|---|---|---|
| 2010/0081508 A1* | 4/2010 | Bhogal | ................... | A63F 13/12 |
| | | | | 463/40 |
| 2010/0199047 A1* | 8/2010 | Corrao | ................ | G06F 16/9574 |
| | | | | 711/141 |
| 2011/0099608 A1* | 4/2011 | Queck | ................ | G06F 21/6209 |
| | | | | 726/4 |
| 2012/0231770 A1* | 9/2012 | Clarke | .................... | H04L 51/34 |
| | | | | 455/414.1 |
| 2017/0326457 A1* | 11/2017 | Tilton | .................... | A63F 13/75 |

FOREIGN PATENT DOCUMENTS

| | | | |
|---|---|---|---|
| CN | 105807920 | A | 7/2016 |
| CN | 105956232 | A | 9/2016 |
| CN | 106020498 | A | 10/2016 |
| CN | 106569605 | A | 4/2017 |

OTHER PUBLICATIONS

Written Opinion of the International Searching Authority dated Jan. 25, 2018, in counterpart International Application No. PCT/ CN2017/ 107262.
International Search Report for PCT/CN2017/107262 dated Jan. 25, 2018 [PCT/ISA/210].

\* cited by examiner

VIRTUAL-REALITY BASED CONTROL METHOD AND APPARATUS

CROSS-REFERENCE TO RELATED APPLICATIONS

This application is a continuation of International Application No. PCT/CN2017/107262, filed on Oct. 23, 2017, in the Chinese Patent Office, which claims priority to Chinese Patent Application No. 201610974040.5, entitled "VIRTUAL-REALITY-BASED CONTROL METHOD AND APPARATUS" filed on Nov. 3, 2016, the disclosures of which are incorporated by reference in their entireties.

BACKGROUND

1. Field

One or more exemplary embodiments of the disclosure relate to the field of virtual reality technologies, and specifically, to virtual-reality-based control.

2. Description of the Related Art

Virtual-reality systems emphasize immersion of users in a virtual reality world and pay attention to improvement of user experience. However, in a virtual world, users have a same psychological models as that in a real world, for example, a safe distance is required between persons. If there is a person who is excessively close to a user, the user may feel a psychological constriction. For example, in a virtual world, when a person comes straight to a user and blocks a user's visible range or virtually performs personal attack on the user, the user's virtual experience is interfered and feels a psychological burden.

In the related art technology, a user can randomly move (e.g., walk) in a virtual three-dimensional world. When the user moves, another user is interfered by the user's movement and feels a psychological burden, which degrades user experience of the another user.

For the foregoing problem, no effective solution has been provided by the related art technology.

SUMMARY

One or more exemplary embodiments provide a virtual-reality-based control method and a virtual-reality-biased control apparatus, to solve at least a technical problem that in a virtual reality system, an object interferes with another object during moving.

According to an aspect of an exemplary embodiment, provided is a virtual-reality-based control method performed by at least one processor of a virtual reality terminal. In the method, a moving instruction initiated by a first object located in a virtual reality scene is detected and a moving request is transmitted to a server based on the moving instruction. A movable area is received from the server in response to the moving request, wherein the movable area does not overlap with a safe area of a second object, the second object being an object other than the first object in the virtual reality scene. The first object is prompted to move within the movable area.

The second object may be located in a preset area in the virtual reality scene, the preset area being determined based on the moving request.

The method may further include receiving, by the at least one processor, a location selection instruction from the first object, the location selection instruction indicating a target location; determining, by the at least one processor, whether the target location is in the movable area; and in response to determining that the target location is not in the movable area, informing, by the at least one processor, the first object that the first object cannot move to the target location.

The moving request may include a target location selected by the first object for moving and the method may further include: receiving from the server, by the at least one processor, information regarding whether the target location is in the safe area of the second object to which the first object is not allowed to move.

The method may further include: obtaining, by the at least one processor, a real-time location of the first object and a real-time location of the second object; and in response to determining that the real-time location of the first object is in the safe area of the second object, prompting, by the at least one processor, the first object to leave an area in which the first object is currently located, wherein the safe area of the second object is determined based on the real-time location of the second object.

The receiving the movable area may include: receiving, from the server, the movable area which is based on an exclusion of the safe area of the second object from the virtual reality scene, wherein the safe area of the second object is a circular area in two-dimensional space of the virtual reality scene, and the safe area is a spherical area in three-dimensional space of the virtual reality scene.

The circular area or the spherical area of the second object may be based on a safe distance of the second object, the safe distance being set for the second object based on an association relationship between the first object and the second object.

The method may further include transmitting, by the at least one processor, a location synchronization request to the server in response to a change of a location of the first object in the virtual reality scene; and receiving from the server, by the at least one processor, a location synchronization notification indicating that the location of the first object stored in the server has been updated to the changed location of the first object.

The server may be a target virtual reality terminal associated with the second object in the virtual reality scene in which the first object is located, and the transmitting the moving request may include transmitting, by the at least one processor of the virtual reality terminal, the moving request to the target virtual reality terminal based on the moving instruction.

According to an aspect of another exemplary embodiment, provided is a virtual-reality-based control apparatus, including: at least one memory operable to store program code; and at least one processor operable to access said at least one memory, read said program code, and operate according to said program code, said program code including: detection code configured to cause the at least one processor to detect a moving instruction initiated by a first object located in a virtual reality scene; first transmitting code configured to cause the at least one processor to transmit a moving request to a server based on the moving instruction; first receiving code configured to cause the at least one processor to receive a movable area from the server in response to the moving request, wherein the movable area does not overlap with a safe area of a second object, the second object being an object other than the first object in the virtual reality scene; and first prompt code configured to cause the at least one processor to prompt the first object to move within the movable area.

The program code may further include: second receiving code configured to cause the at least one processor to receive a location selection instruction from the first object, the location selection instruction indicating a target location; determining code configured to cause the at least one processor to determine whether the target location is in the movable area; and second prompt code configured to cause the at least one processor to, in response to determining that the target location is not in the movable area, inform the first object that the first object cannot move to the target location.

The moving request may include a target location selected by the first object for moving, and the program code may further include: third receiving code configured to cause the at least one processor to receive information regarding whether the target location is in the safe area to which the first object is not allowed to move.

The program code may further include: obtaining code configured to cause the at least one processor to obtain a real-time location of the first object and a real-time location of the second object; and fourth prompt code configured to cause the at least one processor to, in response to determining that the real-time location of the first object is in the safe area of the second object, prompt the first object to leave an area in which the first object is currently located, wherein the safe area of the second object is determined based on the real-time location of the second object.

The movable area may be based on an exclusion of the safe area of the second object from the virtual reality scene, wherein the safe area of the second object is a circular area in two-dimensional space of the virtual reality scene, and the safe area is a spherical area in three-dimensional space of the virtual reality scene.

The circular area or the spherical area of the second object may be based on a safe distance of the second object, the safe distance being set for the second object based on an association relationship between the first object and the second object.

The program code may further include: second transmitting code configured to the at least one processor to transmit a location synchronization request to the server in response to a change of a location of the first object in the virtual reality scene; and fourth receiving code configured to the at least one processor to receive a location synchronization notification indicating that the location of the first object stored in the server has been updated to the changed location of the first object.

The server may be a target virtual reality terminal associated with the second object in the virtual reality scene in which the first object is located, and the first transmitting code further causes the at least one processor to transmit the moving request to the target virtual reality terminal based on the moving instruction According to an aspect of still another exemplary embodiment, provided is a non-transitory computer readable storage medium storing instructions, the instructions, when run on a computer, causing the computer to: detect a moving instruction initiated by a first object located in a virtual reality scene; transmit a moving request to a server based on the moving instruction; receive a movable area from the server in response to the moving request, wherein the movable area does not overlap with a safe area of a second object, the second object being an object other than the first object in the virtual reality scene; and prompt the first object to move within the movable area.

The movable area may be based on an exclusion of the safe area of the second object from the virtual reality scene, the safe area of the second object being a circular area in two-dimensional space of the virtual reality scene, and the safe area being a spherical area in three-dimensional space of the virtual reality scene.

The circular area or the spherical area of the second object may be based on a safe distance of the second object, the safe distance being set for the second object based on an association relationship between the first object and the second object.

For beneficial effects of possible implementations of the components in the virtual-reality-based control apparatus provided in an exemplary embodiment, refer to beneficial effects of methods corresponding to the components in the foregoing virtual-reality-based control method.

An aspect of still another exemplary embodiment provides a virtual-reality-based control device, including:
a processor and a memory, where
the memory is configured to store program code, and transmit the program code to the processor; and
the processor is configured to perform the virtual-reality-based control method according to any implementation of the foregoing embodiment based on instructions in the program code.

For beneficial effects of possible implementations of the components in the virtual-reality-based control device provided in an exemplary embodiment, refer to beneficial effects of methods corresponding to the components in the foregoing virtual-reality-based control method.

An aspect of still another exemplary embodiment provides a non-transitory computer readable storage medium, configured to store program code, the program code being used for performing the virtual-reality-based control method according to any implementation of the foregoing embodiment.

For beneficial effects of possible implementations of the components in the storage medium provided in an exemplary embodiment, refer to beneficial effects of methods corresponding to the components in the foregoing virtual-reality-based control method.

An aspect of still another exemplary embodiment of the disclosure provides a computer program product including instructions, the instructions, when run on a computer, causing the computer to perform the virtual-reality-based control method according to any implementation of the foregoing embodiments.

For beneficial effects of possible implementations of the components in the computer program product including instructions that is provided in an exemplary embodiment, refer to beneficial effects of methods corresponding to the components in the foregoing virtual-reality-based control method.

In exemplary embodiments of the disclosure, the moving operation initiated by the first object is detected by using the virtual reality terminal, the moving request is sent to the server based on the moving operation, the movable area generated by the server based on the moving request and a location of another object in the scene in which the first object is located is received, and the movable location is prompted to the first object, so that the first object moves based on the prompt, thereby achieving an objective that the first object moves in the movable area in the scene. The movable area does not include a safe area of the another object in the scene. Therefore, when moving in the movable are, the first object does not move to the safe area of the another object in the scene, so as to achieve the technical effect that in a virtual-reality system, the first object moves based on the location of the another object in the scene, thereby solving a technical problem that in the virtual-reality system, the first object interferes with the another object due to that the first object moves to the safe area of the another object and therefore is excessively close to the another object in the scene.

BRIEF DESCRIPTION OF THE DRAWINGS

The above and/or other aspects will become apparent and more readily appreciated by describing certain exemplary embodiments with reference to the accompanying drawings, in which.

DETAILED DESCRIPTION

To make a person skilled in the art understand the solutions in the disclosure better, the following clearly and completely describes the technical solutions in the embodiments with reference to the accompanying drawings in the embodiments. Apparently, the described embodiments are merely some but not all of the embodiments. All other embodiments obtained by a person of ordinary skill in the art based on the embodiments without creative efforts shall fall within the protection scope.

It should be noted that in the specification, claims, and accompanying drawings of the disclosure, the terms "first", "second", and so on are intended to distinguish between similar objects but do not necessarily indicate a specific order or sequence. It should be understood that the data termed in such a way are interchangeable in proper circumstances so that the embodiments described herein can be implemented in orders except the order illustrated or described herein. Moreover, the terms "include", "contain" and any other variants mean to cover the non-exclusive inclusion. For example, a process, method, system, product, or device that includes a list of steps or units is not necessarily limited to those expressly listed steps and units, but may include other steps or units not expressly listed or inherent to such a process, method, system, product, or device.

According to the embodiments, a method embodiment that can be executed by using an apparatus embodiment of the disclosure is provided. It should be noted that steps shown in a flowchart in the accompanying drawings may be performed in, for example, a computer system including a group of computer executable instructions. In addition, although a logical order is shown in the flowchart, in some cases, the shown or described steps may be performed in an order different from the logical order herein.

According to an embodiment, a virtual-reality-based control method is provided.

Figure 1:
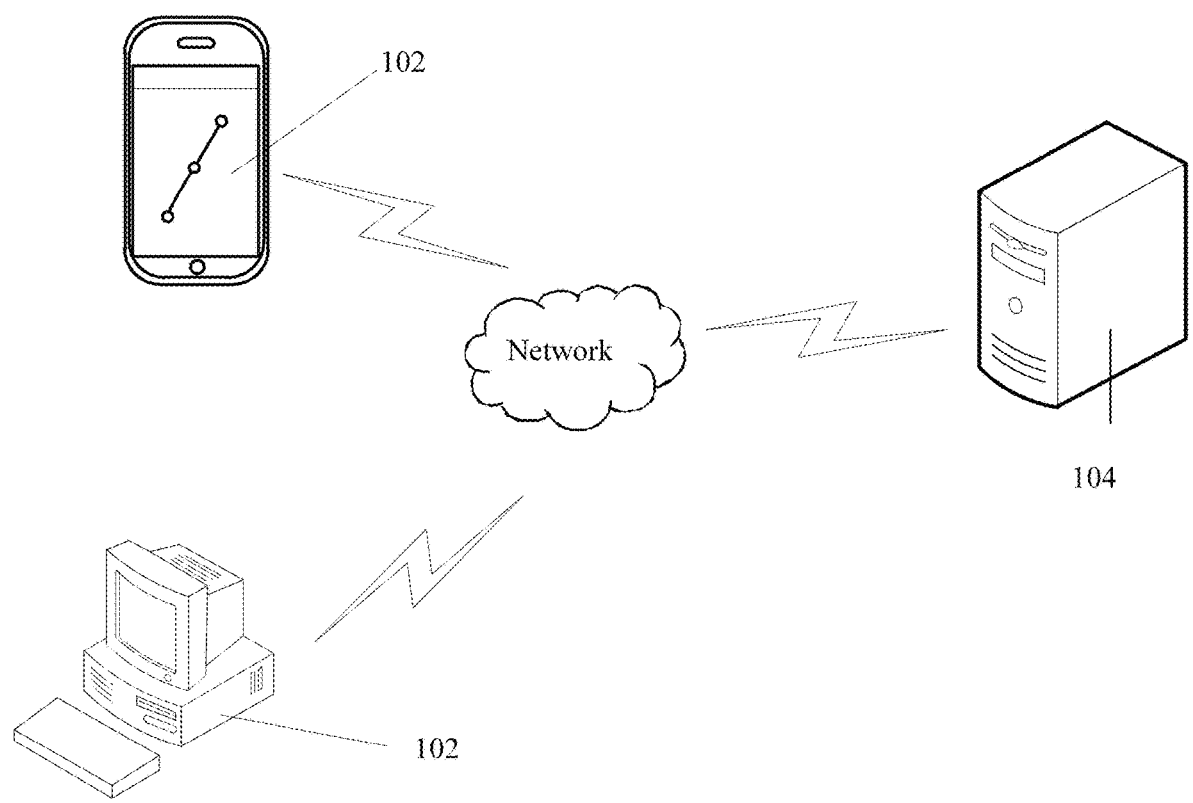
FIG. 1 is an architectural diagram of a hardware system according to an embodiment.

For example, in an exemplary embodiment, the virtual-reality-based control method may be applied to a hardware environment including a terminal 102 and a server 104 that is shown in FIG. 1.

FIG. 1 is an architectural diagram of a hardware system according to an embodiment. As shown in FIG. 1, the terminal 102 is connected to the server 104 through a network. The network includes, for example but is not limited to, a mobile communications network, a wide area network, a metropolitan area network, or a local area network. The terminal 102 may be a virtual reality terminal, a mobile phone terminal, a PC terminal, a notebook terminal, or a tablet computer terminal.

The working principle of a system in the hardware environment shown in FIG. 1 is:

Using an example in which the terminal 102 is a virtual reality terminal, a first object is associated with the terminal 102, that is, the first object is a user of the virtual reality terminal represented by the terminal 102. When the first object initiates a moving operation (or a moving instruction instructing movement in a virtual reality), the terminal 102 detects the moving operation, and sends a moving request to the server 104. The server 104 generates a movable area based on the moving request and a safe area of an object other than the first object in a scene (e.g., in a virtual reality scene) and returns the movable area to the terminal 102, so that the terminal 102 prompts the first object to move based on the movable area. The terminal 102 may control the first object to move within the movable area.

Figure 2:
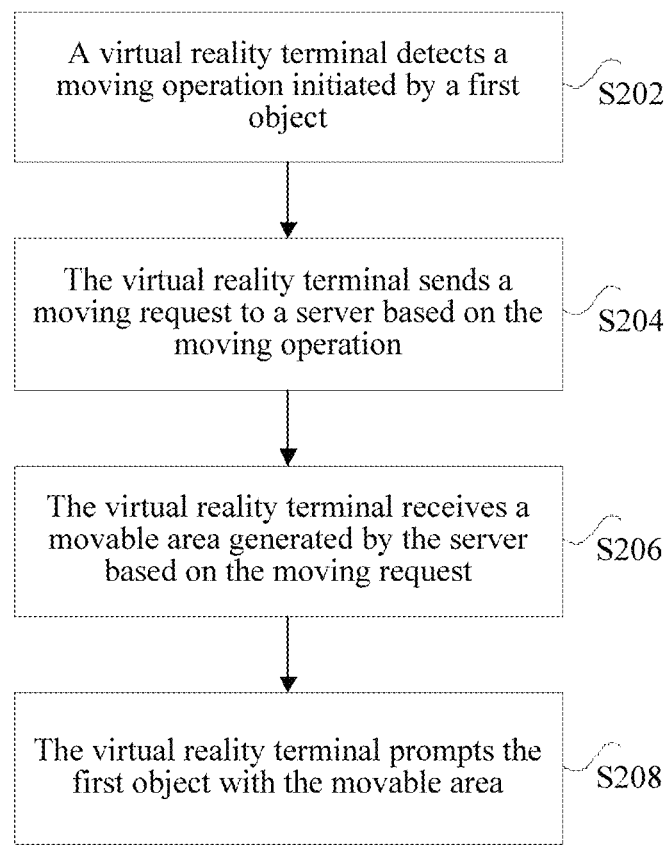
FIG. 2 is a flowchart of an optional virtual-reality-based control method according to an embodiment.

FIG. 2 is a flowchart of a virtual-reality-based control method according to an embodiment. The virtual-reality-based control method according to this embodiment is specifically described below with reference to FIG. 2. As shown in FIG. 2, the virtual-reality-based control method mainly includes the following step S202 to step S208:

Step S202: A virtual reality terminal detects a moving operation initiated by a first object.

Step S204: The virtual reality terminal sends a moving request to a server based on the moving operation.

The first object may initiate the moving operation, and the virtual reality terminal can detect the moving operation initiated by the first object. After detecting the moving operation, the virtual reality terminal may send the moving request to the server based on the moving operation.

For example, when the first object is to move, the first object may initiate the moving operation (or moving instruction) by operating a controller. The controller may be, for example, an operation rod or a motion sensing controller. Alternatively, the first object may perform voice or gesture control by using pre-defined voice, a pre-defined gesture, or the like, so as to initiate the moving operation. The moving operation indicates that the first object is to move. After detecting the moving operation initiated by the first object, the virtual reality terminal sends the moving request to the server, to request to move a location of the first object in a virtual reality scene.

Step S206: The virtual reality terminal receives a movable area generated by the server based on the moving request, where the movable area does not include or overlap with a safe area of a second object, the safe area of the second object is an area in which the first object is not allowed to move, the second object is any object other than the first object in a scene (e.g., virtual reality scene), and the scene is a scene in which the first object is located.

Step S208: The virtual reality terminal prompts the first object with the movable area, where the first object performs the moving operation based on the prompted movable area. The first object may perform the moving operation to move within the prompted movable area.

After sending the moving request to the server, the virtual reality terminal may receive the movable area generated by the server based on the moving request. The movable area may be generated by the server and indicate an area in which the first object is allowed to move. There may be a plurality of objects in the scene in which the first object is located, each object has a safe area of the object, and other objects than the object cannot enter the safe area of the object. Therefore, the movable area of the first object cannot include a safe area of another object. The virtual reality terminal may prompt the first object with the received movable area, so that the first object selects a target location based on the prompted movable area for moving.

There may be a plurality of other objects in the scene in which the first object is located, and the other objects have respective safe areas of their own. In some cases, the moving operation may include the target location of the first object, that is, a possible moving direction of the first object may be learned of. For an object not in the moving direction, the first object does not enter a safe area of the object in a moving process. In an exemplary embodiment, to reduce the calculated amount of the server, the second object may be any object in a preset area in the scene, and the preset area is determined based on the moving request, so that the movable area does not include or overlap with a safe area of any object in the preset area.

There may be a plurality of objects in the scene in which the first object is located, each object has a respective safe area of its own, and other objects than the object cannot move in the safe area of the object. Therefore, the movable area of the first object does not include or overlap with a safe area of another object. A safe area of an object may be obtained based on a location of the object and a safe distance of the object for another object. Therefore, an implementation of determining the movable area may be such that after the sending, by the virtual reality terminal, a moving request to a server based on the moving operation, the implementation further includes: obtaining, by the server, a safe distance of each object in the scene in which the first object is located; generating, by the server, a safe area of each object based on the safe distance, where the safe area in two-dimensional space is a circular area, and the safe area in three-dimensional space is a spherical area; and deleting (or excluding), by the server, the safe area of each object from the scene to obtain the movable area.

It may be understood that when the scene is two-dimensional space, a safe area of an object is a circular area with a location of the object as a center and a safe distance as a radius. When the scene is three-dimensional space, a safe area of an object is a spherical area with a location of the object as a sphere center and a safe distance as a sphere radius. The first object can move only in an area in the scene other than the safe area of the another object, that is, an area obtained by deleting (or excluding) the safe area of the another object from the scene is the safe area of the first object.

In this embodiment, the obtaining, by the server, a safe distance of each object in the scene in which the first object is located includes: obtaining, by the server, a preset safe distance or a default safe distance of each object for the first object, where the preset safe distance is obtained by each object based on an association relationship between each object and the first object.

It may be understood that when the safe area of the another object for the first object is calculated, the safe distance is a safe distance that is set by the another object for the first object. Safe distances that are set by different objects for the first object may be set based on association relationships between the different objects and the first object.

The association relationship may be, for example, a close-or-distant relationship. When an object has a close relationship with the first object, the object may set a safe distance to a relatively small value. When an object has a distant relationship with the first object, the object may set a safe distance to a relatively large value. For example, if a relationship between an object A and the first object is a relationship that is relatively close (e.g., a friend relationship), a safe distance of the object A for the first object may be set to a relatively small value, for example, may be set to one unit length. If a relationship between an object B and the first object is a relationship that is relatively distant (e.g., an enemy relationship), a safe distance of the object B for the first object may be set to a relatively large value, for example, may be set to three unit lengths. If a relationship between an object C and the first object and a relationship between an object D and the first object are common relationships, a safe distance of the object C for the first object and a safe distance between the object D for the first object do not need to be particularly set and are two unit lengths by default.

In the embodiments, the moving operation initiated by the first object is detected by using the virtual reality terminal, the moving request is sent to the server based on the moving operation, the movable area generated by the server based on the moving request and a location of another object in the scene (e.g., virtual reality scene) in which the first object is located is received, and the movable location is prompted to the first object, so that the first object moves based on the prompt, thereby achieving an objective that the first object moves in the movable area in the scene. The movable area does not include or overlap with a safe area of the another object in the scene. Therefore, when moving in the movable area, the first object does not move to the safe area of the another object in the scene, so as to achieve the technical effect that in a virtual-reality system, the first object moves based on the location of the another object in the scene, thereby solving a technical problem that in the virtual-reality system, the first object interferes with the another object due to the first object moving to the safe area of the another object and becoming excessively close to the another object in the scene.

To ensure that the first object does not move to the safe area of the another object in the scene, the first object may move based on the movable area prompted by the virtual reality terminal to the first object. In an implementation, after the prompting, by the virtual reality terminal, the first object with the movable area, the virtual-reality-based control method may further include: receiving, by the virtual reality terminal, a location selection instruction sent by the first object, where the location selection instruction is used for indicating a target location selected by the first object for moving; determining, by the virtual reality terminal, whether the target location is in the movable area; and if determining that the target location is in the movable area, informing, by the virtual reality terminal, the first object that the first object can move to the target location; or if determining that the target location is not in the movable area, informing, by the virtual reality terminal, the first object that the first object cannot move to the target location.

It should be noted that after the virtual reality terminal prompts the first object with the movable area generated by the server, the first object may select the target location based on the prompted movable area for moving. After selecting the target location for moving, the first object sends the target location to the virtual reality terminal. The virtual reality terminal determines whether the target location is in the movable area, and provides a corresponding prompt for the first object: when the target location is in the movable area, informing the first object that the first object can move to the target location; or when the target location is not in the movable area, informing the first object that the first object cannot move to the target location. The prompt may be in a plurality of forms, for example, voice prompt, visual prompt, and sense prompt.

Figure 3:
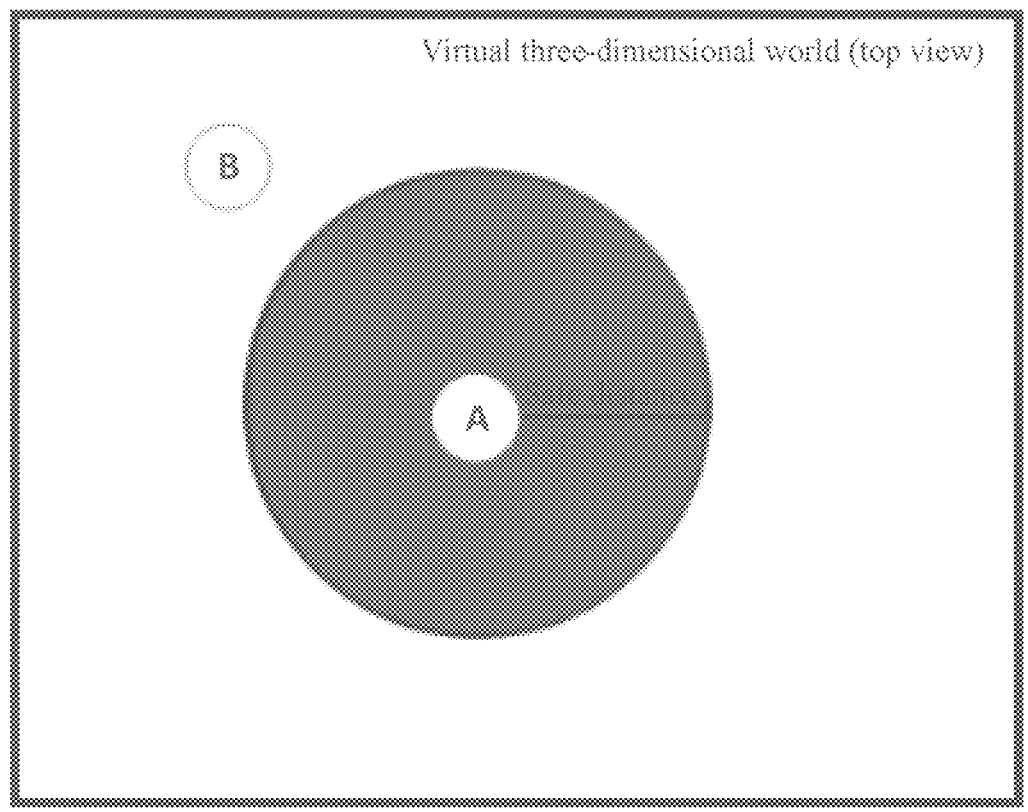
FIG. 3 is a schematic diagram of moving based on a safe area according to an embodiment.

FIG. 3 is a schematic diagram of moving based on a safe area according to an embodiment.

As shown in FIG. 3, the first object is B, the second object is A, the safe distance may be a safe distance that is set by A for B, a circular area is a safe area of A for B, and the safe area may be generated based on the safe distance. In this case, B selects a target location for moving, and sends the target location to the virtual reality terminal. The virtual reality terminal may determine the target location of B: if determining that the target location is in the movable area, the virtual reality terminal sends a prompt to B by, for example, playing pre-defined sound or personalized voice, making the target location in a visual system displayed as green, causing the controller to vibrate in a pre-defined manner, or using a combination of a plurality of manners, that B can move to the target location; or if determining that the target location is in the safe area of A, the virtual reality terminal sends a prompt to B that B cannot move to the target location. Correspondingly, the prompt may be: playing other pre-defined sound or personalized voice, making the target location in the visual system displayed as red, or causing the controller to vibrate in a pre-defined manner. Alternatively, the prompt may be sent by using a combination of a plurality of manners.

In a virtual-reality system, a moving manner of the first object may be instantaneous moving or common moving based on different cases. The instantaneous moving refers to a location change of directly (or instantly) moving from an initial location to the target location, skipping a location moving process. The common moving refers to a location moving process from the initial location to the target location.

When performing instantaneous moving, the first object initiates an instantaneous moving operation. The virtual reality terminal may send the moving request to the server after detecting the instantaneous moving operation of the first object. The server may receive the moving request and generate the movable area, and return the movable area to the virtual reality terminal. The virtual reality terminal may prompt the first object with the movable area. In this case, the first object may select a target location for instantaneous moving, and sends the target location to the virtual reality terminal. The virtual reality terminal may determine whether the target location is in the movable area. If determining that the target location is not in the movable area, the virtual reality terminal sends a prompt to the first object that the first object cannot instantaneously move to the target location and cannot complete the instantaneous moving, and the first object needs to reselect a target location for instantaneous moving. If determining that the target location is in the movable area, the virtual reality terminal sends a prompt to the first object that the first object can instantaneously move to the target location and complete the corresponding instantaneous moving.

When performing common moving, the first object initiates a common moving operation. The virtual reality terminal may send the moving request to the server after detecting the common moving operation. The server may receive the moving request and generate the movable area, and return the movable area to the virtual reality terminal. The virtual reality terminal may prompt the first object with the movable area. In this case, a first terminal may select a target location for common moving for the first object, and sends the target location to the virtual reality terminal. The virtual reality terminal may determine whether the target location is in the movable area. If determining that the target location is not in the movable area, the virtual reality terminal sends a prompt to the first object that the first object cannot move to the target location and cannot complete the moving, and the first object needs to reselect a target location for common moving. If determining that the target location is in the movable area, the virtual reality terminal sends a prompt to the first object that the first object can move to the target location and automatically plans a moving route based on the movable area. The first object moves to the target location based on the route.

In an exemplary embodiment, the moving operation may be a trigger instruction enabling the virtual reality terminal to learn that the first object wants to move and may include the target location. When the moving operation includes a target location selected by the first object for moving, the virtual-reality-based control method according to an exemplary embodiment may prevent the first object from moving to the safe area of the another object in the scene, thereby avoiding interference with the another object. To this end, in an implementation, the virtual-reality-based control method may further include, before the receiving, by the virtual reality terminal, a movable area generated by the server based on the moving request: receiving, by the virtual reality terminal, first prompt information generated by the server based on the target location, where the first prompt information is used for indicating that the target location is in the safe area and inform that the first object is not allowed to move to the target location; or receiving, by the virtual reality terminal, second prompt information generated by the server based on the target location, where the second prompt information is used for indicating that the target location is outside the safe area and inform that the first object is allowed to move to the target location.

It should be noted that the first object may first select the target location for moving, that is, when the first object initiates the moving operation, the moving operation includes a target moving location of the first object, and the virtual reality terminal may send the moving request to the server based on the moving operation. After receiving the moving request, the server may obtain the target moving location included in the request, determine whether the target moving location is in the movable area, generate corresponding prompt information, and send the prompt information to the virtual reality terminal. That is, before receiving the movable area generated by the server, the virtual reality terminal receives the prompt information generated by the server based on the target location; and when the target location is not in the movable area, receives the first prompt information, where the first prompt information indicates that the target location is in the safe area of the another object and the first object is not allowed to move to the target location; or when the target location is in the movable area, receives the second prompt information, where the second prompt information indicates that the target location is not in the safe area of the another object and the first object is allowed to move to the target location.

A moving manner of the first object may be instantaneous moving or common moving. When performing instantaneous moving, the first object initiates an instantaneous moving operation. The instantaneous moving operation includes a target location of the first object for instantaneous moving. The virtual reality terminal may send the moving request to the server after detecting the instantaneous moving operation. The server may generate the movable area based on the received moving request, and determine the target location to generate prompt information. When determining that the target location is not in the movable area, the server generates the first prompt information, where the first prompt information may inform that the target location is in the safe area of the another object and the first object cannot instantaneously move to the target location. The server may return the first prompt information to the virtual reality terminal. The virtual reality terminal informs, based on the first prompt information, that the first object cannot instantaneously move to the target location. When determining that the target location is in the movable area, the server generates the second prompt information, where the second prompt information may inform that the target location is not in the safe area of the another object and the first object can instantaneously move to the target location. The server may send the second prompt information to the virtual reality terminal. The virtual reality terminal informs, based on the second prompt information, that the first object can instantaneously move to the target location, so that the first object completes the instantaneous moving.

When performing common moving, the first object initiates a common moving operation. The common moving operation includes a target location of the first object for moving. The virtual reality terminal sends the moving request to the server after detecting the common moving operation. The server generates the movable area based on the received moving request, and determines the target location to generate prompt information. When determining that the target location is not in the movable area, the server generates the first prompt information, where the first prompt information may inform that the target location is in the safe area of the another object and the first object cannot move to the target location. The server may return the first prompt information to the virtual reality terminal. The virtual reality terminal informs, based on the first prompt information, that the first object cannot move to the target location. When determining that the target location is in the movable area, the server generates the second prompt information, where the second prompt information may inform that the target location is not in the safe area of the another object and the first object can move to the target location. In addition, the server may plan a moving route based on the target location and the movable area, and send the second prompt information and the moving route to the virtual reality terminal. The virtual reality terminal informs that the first object can move to the target location, so that the first object moves to the target location based on the route.

When the location of the first object moves, the virtual reality terminal obtains both location information of the first object and the another object, and determines whether the first object has moved to the safe area of the another object. If the first object has moved to the safe area of the another object, the virtual reality terminal sends a prompt to the first object to prompt the first object to leave the safe area of the another object. That is, after the prompting, by the virtual reality terminal, the first object with the movable area, the virtual-reality-based control method may further include: obtaining, by the virtual reality terminal, a real-time location of the first object and a real-time location of the second object; and when the real-time location of the first object is in the safe area of the second object, prompting, by the virtual reality terminal, the first object to leave an area in which the first object is located, where the safe area of the second object is determined based on the real-time location of the second object.

Figure 4:
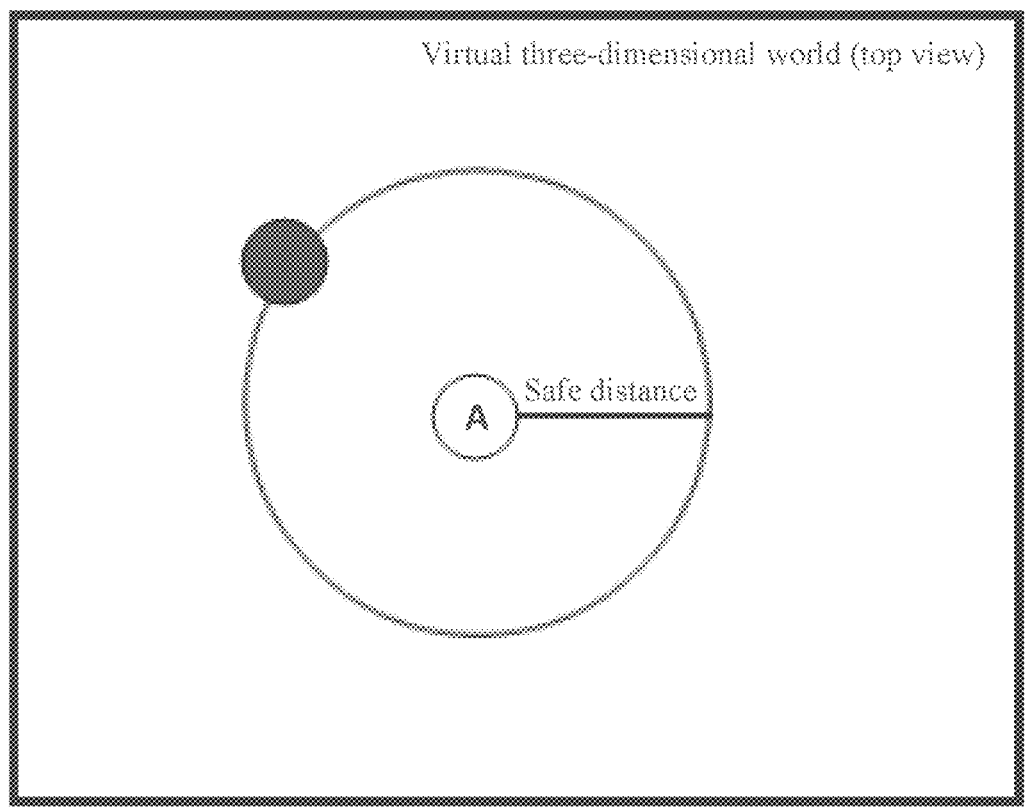
FIG. 4 is a schematic diagram of moving into a safe area according to an embodiment.

FIG. 4 is a schematic diagram of moving into a safe area according to an embodiment. As shown in FIG. 4, the first object is B, the second object is A, the safe distance may be a safe distance that is set by A for B, and a circular area is a safe area of A for B. A location to which B moves is in the safe area of A. In this case, the virtual reality terminal obtains locations of A and B, and determines that B enters the safe area of A. Therefore, the virtual reality terminal sends a prompt to B to prompt B to leave the safe area of A, and does not stop sending the prompt to B until B has left the safe area of A.

In this embodiment, locations of all objects are stored in the server in advance. When the locations of the objects change in the scene, the virtual-reality-based control method according to an exemplary embodiment can control such that the locations of all the objects stored in the server are the same as locations of the objects in the scene, so as to ensure accuracy of the locations of the objects stored in the server. To this end, the virtual-reality-based control method may further include, before or after the detecting, by a virtual reality terminal, a moving operation initiated by a first object: sending, by the virtual reality terminal, a location synchronization request to the server when a location changes, so that the server updates the stored location of the virtual reality terminal based on the location synchronization request; and receiving, by the virtual reality terminal, a location synchronization notification sent by the server, where the location synchronization notification includes a location of each object in the scene in which the first object is located.

The server may obtain the movable area of the first object by deleting (or excluding) the safe area of the another object from an area of the scene. The locations of all the objects are stored in the server in advance, and when a location of an object changes, the server performs location synchronization on the object to update the location of the object. For example, the server stores location information of all the objects in the scene, where an object is associated with a virtual reality terminal, and location information of the object is location information of the virtual reality terminal associated with the object. After the first object moves, the location of the first object changes, and the virtual reality terminal associated with the first object sends the location synchronization request to the server to request the server to update the original location of the first object based on a location to which the first object moves. After receiving the synchronization request, the server updates the location of the first object based on the location to which the first object moves, and sends a location update notification to the first object. The location update notification includes an updated location of the first object, and further includes locations of all other objects in the scene. In addition, the server may further send the location update notification of the first object to the other objects in the scene.

Figure 5:
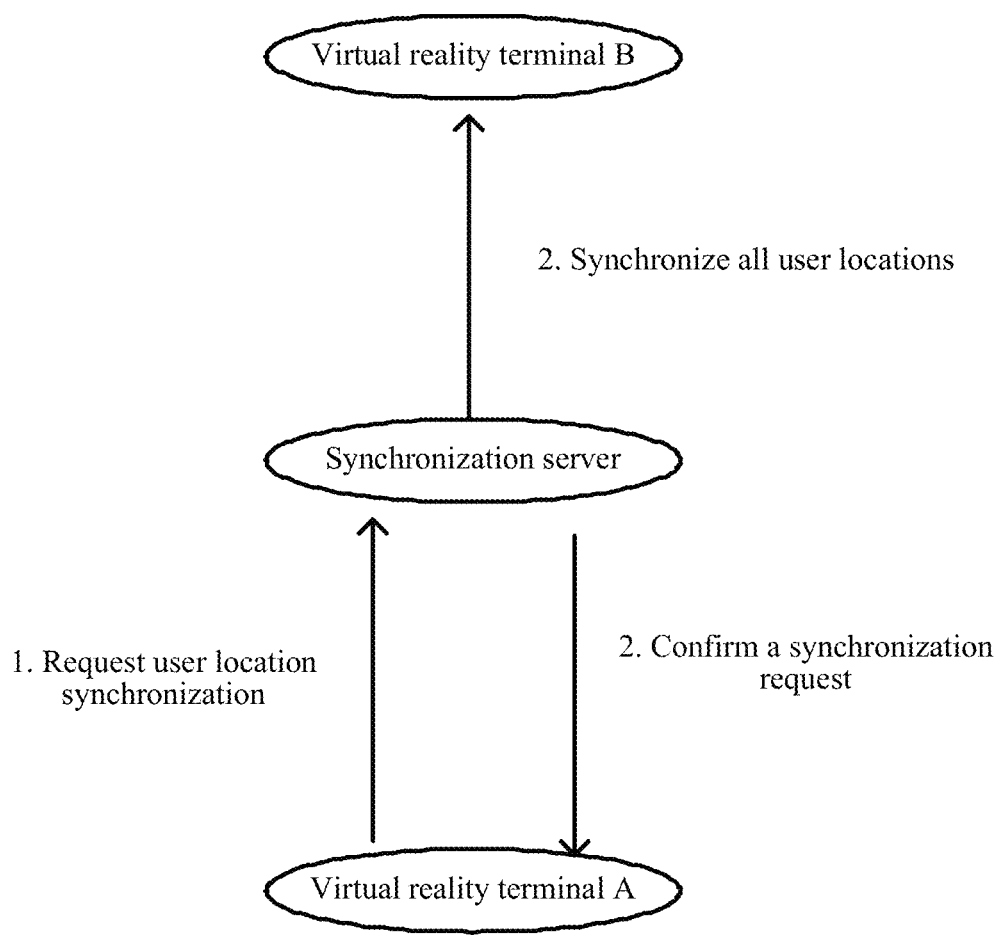
FIG. 5 is a flowchart of location synchronization according to an embodiment.

FIG. 5 is a flowchart of location synchronization according to an embodiment.

As shown in FIG. 5, in this embodiment, the server may be a synchronization server. Locations of a virtual reality terminal A and a virtual reality terminal B are stored in the synchronization server in advance. The virtual reality terminal A is associated with an object A, and the virtual reality terminal B is associated with an object B. Here, the object A may correspond to the first object described above with reference to the foregoing embodiments. When a location of the object A changes, requesting the server for location synchronization may mainly include the following steps:

1. Request user location synchronization. After the object A moves, the location of the object A changes. The virtual reality terminal A detects that the location of the object A changes, obtains a changed location of the object A, and sends a location synchronization request to the synchronization server to request location synchronization.

2. Confirm the synchronization request and synchronize all user locations. The synchronization server updates the location of the object A based on location synchronization request, sends an update notification to the virtual reality terminal, and confirms the synchronization request. The update notification includes an updated location of the object A, and further includes a location of the object B in a scene in which the object A is located. In addition, the synchronization server sends the location update notification of the object A to the virtual reality terminal B, and notifies the object B of the changed location of the object A.

In an implementation, the server may be a target virtual reality terminal in the scene in which the first object is located. The target virtual reality terminal is a virtual reality terminal associated with any object in the scene, and the sending, by the virtual reality terminal, a moving request to a server based on the moving operation includes: sending, by the virtual reality terminal, the moving request to the target virtual reality terminal based on the moving operation.

Virtual reality terminals associated with all the objects in the scene are connected to form a network. A server may be independently set in the network, or a virtual reality terminal associated with any object in the network may be selected as the server. When a virtual reality terminal associated with an object in the network is used as the server, the virtual reality terminal is used as the target virtual reality terminal in the scene in which the first object is located. In this way, that the virtual reality terminal sends the moving request to the server is sending the moving request to the target virtual reality terminal.

Figure 6:
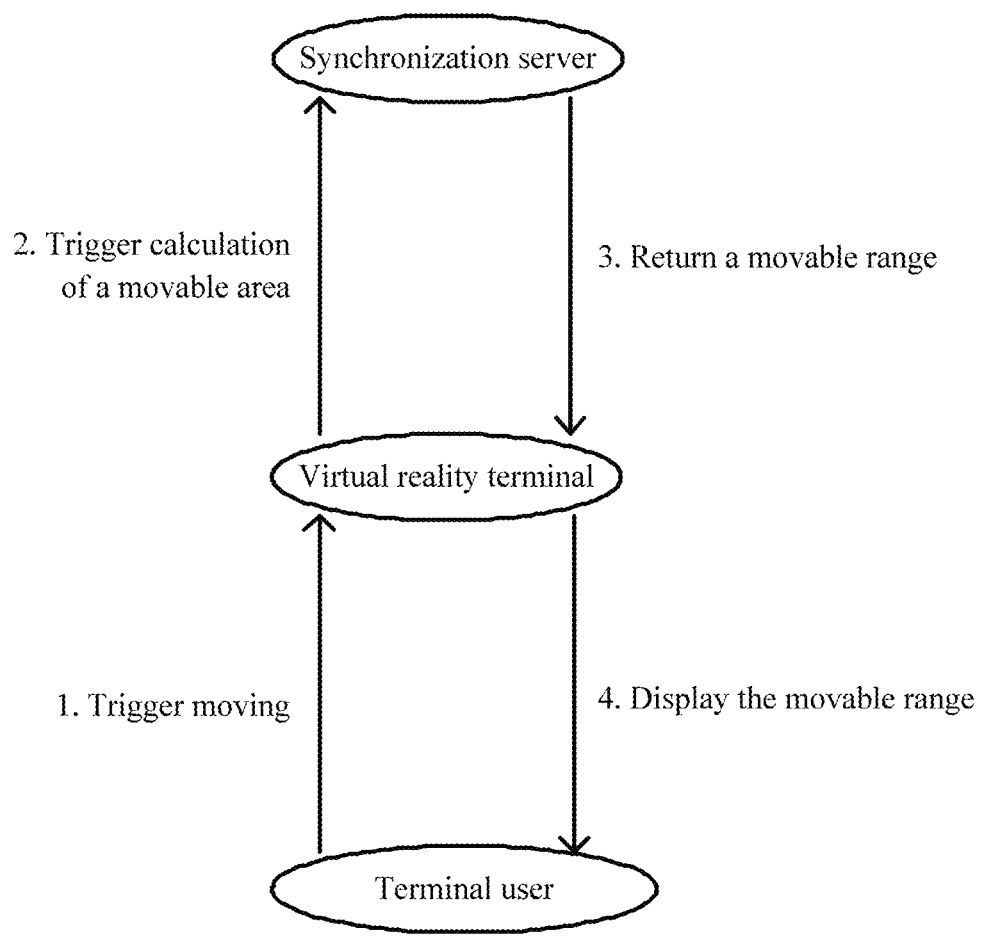
FIG. 6 is a flowchart of an optional virtual-reality-based control method according to an embodiment.

FIG. 6 is a flowchart of an optional virtual-reality-based control method according to an embodiment. In the method embodiment shown in FIG. 6, the scene includes a terminal user that is associated with a virtual reality terminal. Here, the terminal user may correspond to the first object described above with reference to the foregoing embodiments. The terminal user selects a moving location based on a prompt of the virtual reality terminal for moving. Operation in which the terminal user moves may include the following steps:

1. Trigger moving. The terminal user may initiate a moving operation by operating a controller. The controller may be, for example, an operation rod or a motion sensing controller. Alternatively, the first object may perform voice or gesture control by using pre-defined voice, a pre-defined gesture, or the like, so as to initiate the moving operation. The virtual reality terminal detects the moving operation and triggers the moving.

2. Trigger calculation of a movable area. The virtual reality terminal sends a moving request to a synchronization server based on the detected moving operation, to trigger the calculation of the movable area. The synchronization server generates a movable range (or equivalent to the movable area described above) based on the moving request. Specifically, the synchronization server obtains safe areas of all terminal users based on locations of all the terminal users and safe distances of all the terminal users in the scene that are stored in advance, and deletes the safe areas of all the terminal users from an area of the scene, to obtain the movable range.

3. Return the movable range. The synchronization server returns the generated movable range to the virtual reality terminal.

4. Display the movable range. The virtual reality terminal performs moving prompting on the terminal user based on the movable range, displays the movable range to the terminal user, and prompts the terminal user after the terminal user selects a target location for moving: if determining that the target location for moving is in the movable range, the virtual reality terminal informs the terminal user that the terminal user can move to the target location; or if determining that the target location is outside the movable range, the virtual reality terminal informs the terminal user that the terminal user cannot move to the target location.

Figure 7:
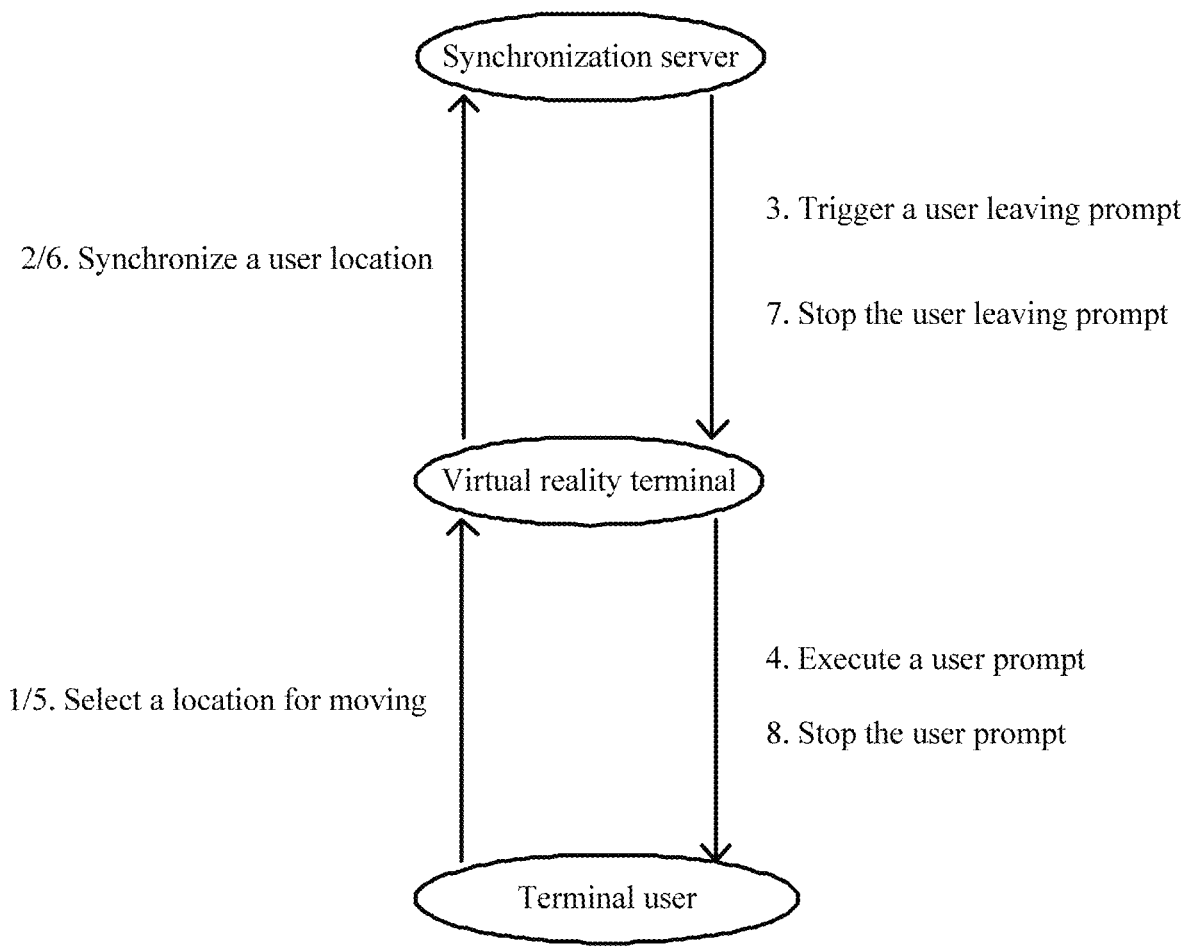
FIG. 7 is a flowchart of an optional virtual-reality-based control method according to an embodiment.

FIG. 7 is a flowchart of an optional virtual-reality-based control method according to an embodiment. In the method embodiment shown in FIG. 7, the scene includes a terminal user, which is equivalent to a first object described above in the foregoing embodiments, and the terminal user is associated with a virtual reality terminal. In a process in which the terminal user moves, the virtual reality terminal prompts the terminal user based on a location to which the terminal user moves. Operation in which the terminal user moves may include the following steps:

1. Select a target location for moving. The terminal user initiates a moving operation, selects the target location for moving, and moves to the target location. The virtual reality terminal detects the moving operation and obtains the location to which the terminal user moves.

2. Synchronize the location to which the terminal user moves. The virtual reality terminal sends a moving request to a synchronization server based on the detected moving operation and the location to which the terminal user moves, and requests the synchronization server to update a location of the terminal user based on the location to which the terminal user moves. The synchronization server generates a movable area based on the moving request. Specifically, the synchronization server obtains safe areas of all terminal users based on locations of all the terminal users and safe distances of the terminal users in a scene that are stored in advance, and deletes the safe areas of all the terminal users from an area of the scene to obtain the movable area. The synchronization server determines whether the location to which the terminal user moves is in the movable area.

3. Trigger a user leaving prompt. When determining that the location to which the terminal user moves is not in the movable area, the synchronization server triggers the user leaving prompt and continuously sending the user leaving prompt to the virtual reality terminal.

4. Execute a user prompt. After receiving the user leaving prompt, the virtual reality terminal prompts the terminal user to leave the location.

5. Reselect a target location for moving. The terminal user initiates a moving operation by using a controller based on the prompt, selects a new target location, leaves the location, and moves to the new target location. The virtual reality terminal detects the moving operation and obtains the new location to which the terminal user moves.

6. Synchronize the new location for moving. The virtual reality terminal sends a moving request to the synchronization server based on the detected moving operation and the new location of the terminal user, and requests the synchronization server to update the location of the terminal user based on the new location. The synchronization server regenerates a movable area based on the moving request, and determines whether the new location is in the movable area.

7. Stop the user leaving prompt. The synchronization server determines that the new location is in the movable area, stops sending the user leaving prompt to the virtual reality terminal, and updates the location of the terminal user based on the new location.

8. Stop the user prompt. After no longer receiving the user leaving prompt, the virtual reality terminal stops the prompt to the terminal user. The terminal user completes location moving.

It should be noted that for ease of description, each of the foregoing method embodiments is described as a series of action combinations, but a person skilled in the art should understand that the disclosure is not limited to an order of described actions because according to the disclosure, some steps may use another order or be performed at the same time. In addition, a person skilled in the art should also understand that all the embodiments described in this specification are merely exemplary embodiments, and the related actions and/or modules may not be present in the disclosure.

By means of the descriptions of the foregoing implementations, a person skilled in the art should note that the method in the foregoing embodiment may be implemented by relying on software and a commodity hardware platform or by using hardware, and the former one may be a form of implementation in many cases. Based on the understanding, the technical solutions of the disclosure, or the part contributing to the existing technology, may be presented in the form of a software product. The computer software product may be stored in a storage medium (for example, a ROM/RAM, a magnetic disk, or an optical disc) including several instructions to enable a terminal device (which may be a cell phone, a computer, a server, a network device, or the like) to perform the methods described in the embodiments.

According to an embodiment, a virtual-reality-based control apparatus configured to implement the foregoing virtual-reality-based control method is further provided. The virtual-reality-based control apparatus is mainly configured to perform the virtual-reality-based control method provided in the foregoing content in the embodiments. The virtual-reality-based control apparatus provided in this embodiment is specifically described below.

Figure 8:
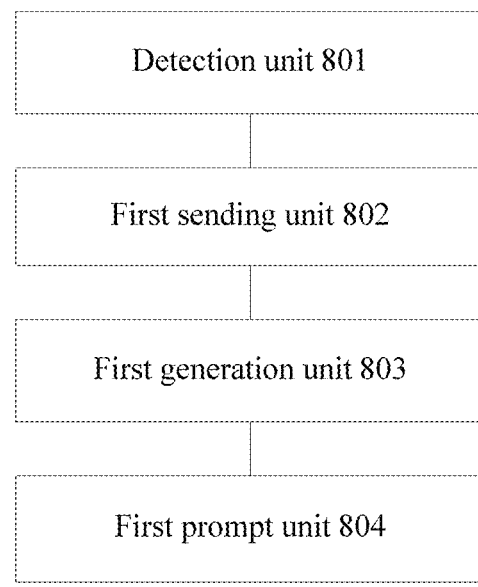
FIG. 8 is a schematic diagram of an optional virtual-reality-based control apparatus according to an embodiment.

FIG. 8 is a schematic diagram of an optional the virtual-reality-based control apparatus according to an embodiment. As shown in FIG. 8, the virtual-reality-based control apparatus mainly includes: a detection unit 801, a first sending unit 802, a first generation unit 803, and a first prompt unit 804.

The detection unit 801 is configured to detect, by using a virtual reality terminal, a moving operation initiated by a first object.

The first sending unit 802 is configured to send a moving request to a server by using the virtual reality terminal based on the moving operation.

When needing to move, the first object may initiate the moving operation, and the virtual reality terminal can detect the moving operation initiated by the first object. After detecting the moving operation, the virtual reality terminal may send the moving request to the server based on the moving operation.

For example, when the first object is to move, the first object may initiate the moving operation by operating a controller. The controller may be, for example, an operation rod or a motion sensing controller. Alternatively, the first object may perform voice or gesture control by using pre-defined voice, a pre-defined gesture, or the like, so as to initiate the moving operation. The moving operation indicates that the first object is to move. After detecting the moving operation initiated by the first object, the virtual reality terminal sends the moving request to the server, to request to move a location of the first object.

The first generation unit 803 is configured to receive, by using the virtual reality terminal, a movable area generated by the server based on the moving request, where the movable area does not include or overlap with a safe area of a second object, the safe area is an area in which the first object is not allowed to move, the second object is any object in a scene, and the scene is a scene in which the first object is located.

The first prompt unit 804 is configured to prompt the first object with the movable area by using the virtual reality terminal, so that the first object performs the moving operation based on the prompted movable area.

After sending the moving request to the server, the virtual reality terminal may receive the movable area generated by the server based on the moving request. The movable area may be generated by the server and indicate an area in which the first object is allowed to move. There may be a plurality of objects in the scene in which the first object is located, each object has a safe area of the object, and other objects than the object cannot enter the safe area. Therefore, the movable area of the first object cannot include a safe area of another object. The virtual reality terminal may prompt the first object with the received movable area, so that the first object selects a target location based on the prompted movable area for moving.

In the embodiments, the moving operation initiated by the first object is detected by using the virtual reality terminal, the moving request is sent to the server based on the moving operation, the movable area generated by the server based on the moving request and a location of another object in the scene in which the first object is located is received, and the movable location is prompted to the first object, so that the first object moves based on the prompt, thereby achieving an objective that the first object moves in the movable area in the scene. The movable area does not include or overlap with a safe area of the another object in the scene. Therefore, when moving in the movable are, the first object does not move to the safe area of the another object in the scene, so as to achieve the technical effect that in a virtual-reality system, the first object moves based on the location of the another object in the current scene, thereby solving a technical problem that in the virtual-reality system, the first object interferes with the another object due to that the first object moves to the safe area of the another object and therefore is excessively close to the another object in the scene.

To ensure that the first object does not move to the safe area of the another object in the scene, the first object may move based on the movable area prompted by the virtual reality terminal to the first object. In an implementation, the apparatus may further include a first receiving unit, configured to: after the virtual reality terminal prompts the first object with the movable area, receive, by using the virtual reality terminal, a location selection instruction sent by the first object, where the location selection instruction is used for indicating a target location selected by the first object for moving; a determining unit, configured to determine, by using the virtual reality terminal, whether the target location is in the movable area; and a second prompt unit, configured to: if the virtual reality terminal determines that the target location is in the movable area, inform the first object that the first object can move to the target location; or a third prompt unit, configured to: if the virtual reality terminal determines that the target location is not in the movable area, inform the first object that the first object cannot move to the target location.

It should be noted that after the virtual reality terminal prompts the first object with the movable area generated by the server, the first object may select the target location based on the prompted movable area for moving. After selecting the target location for moving, the first object sends the target location to the virtual reality terminal. The virtual reality terminal determines whether the target location is in the movable area, and provides a corresponding prompt for the first object: when the target location is in the movable area, informing the first object that the first object can move to the target location; or when the target location is not in the movable area, informing the first object that the first object cannot move to the target location. The prompt may be in a plurality of forms, for example, voice prompt, visual prompt, and sense prompt.

Referring back to FIG. 3, the first object is B, the second object is A, the safe distance may be a safe distance that is set by A for B, a circular area is a safe area of A for B, and the safe area may be generated based on the safe distance. In this case, B selects a target location for moving, and sends the target location to the virtual reality terminal. The virtual reality terminal may determine the target location of B: if determining that the target location is in the movable area, the virtual reality terminal sends a prompt to B by, for example, playing pre-defined sound or personalized voice, making the target location in a visual system displayed as green, causing the controller to vibrate in a pre-defined manner, or using a combination of a plurality of manners, that B can move to the target location; or if determining that the target location is in the safe area of A, the virtual reality terminal sends a prompt to B that B cannot move to the target location. Correspondingly, the prompt may be: playing other pre-defined sound or personalized voice, making the target location in the visual system displayed as red, or causing the controller to vibrate in a pre-defined manner. Alternatively, the prompt may be sent by using a combination of a plurality of manners.

In a virtual-reality system, a moving manner of the first object may be instantaneous moving or common moving based on different cases. The instantaneous moving refers to a location change of directly (or instantly) moving from an initial location to the target location, skipping a location moving process. The common moving refers to a location moving process from the initial location to the target location.

When performing instantaneous moving, the first object initiates an instantaneous moving operation. The virtual reality terminal may send the moving request to the server after detecting the instantaneous moving operation of the first object. The server may receive the moving request and generate the movable area, and return the movable area to the virtual reality terminal. The virtual reality terminal may prompt the first object with the movable area. In this case, the first object may select a target location for instantaneous moving, and sends the target location to the virtual reality terminal. The virtual reality terminal determines whether the target location is in the movable area. If determining that the target location is not in the movable area, the virtual reality terminal sends a prompt to the first object that the first object cannot instantaneously move to the target location and cannot complete the instantaneous moving, and the first object needs to reselect a target location for instantaneous moving. If determining that the target location is in the movable area, the virtual reality terminal sends a prompt to the first object that the first object can instantaneously move to the target location and complete the corresponding instantaneous moving.

When performing common moving, the first object initiates a common moving operation. The virtual reality terminal may send the moving request to the server after detecting the common moving operation. The server may receive the moving request and generate the movable area, and return the movable area to the virtual reality terminal. The virtual reality terminal may prompt the first object with the movable area. In this case, a first terminal may select a target location for common moving for the first object, and sends the target location to the virtual reality terminal. The virtual reality terminal may determine whether the target location is in the movable area. If determining that the target location is not in the movable area, the virtual reality terminal sends a prompt to the first object that the first object cannot move to the target location and cannot complete the moving, and the first object needs to reselect a target location for common moving. If determining that the target location is in the movable area, the virtual reality terminal sends a prompt to the first object that the first object can move to the target location and automatically plans a moving route based on the movable area. The first object moves to the target location based on the route.

In an exemplary embodiment, the moving operation may be a trigger instruction enabling the virtual reality terminal to learn that the first object wants to move and may include the target location. When the moving operation includes a target location selected by the first object for moving, the virtual-reality-based control apparatus according to an exemplary embodiment may prevent the first object from moving to the safe area of the another object in the scene, thereby avoiding interference with the another object. To this end, in an implementation, the virtual-reality-based control apparatus may further include: a second receiving unit, configured to receive, by using the virtual reality terminal, first prompt information generated by the server based on the target location, where the first prompt information is used for indicating that the target location is in the safe area and inform that the first object is not allowed to move to the target location; or a third receiving unit, configured to receive, by using the virtual reality terminal, second prompt information generated by the server based on the target location, where the second prompt information is used for indicating that the target location is outside the safe area and inform that the first object is allowed to move to the target location.

It should be noted that the first object may first select the target location for moving, that is, when the first object initiates the moving operation, the moving operation includes a target moving location of the first object, and the virtual reality terminal may send the moving request to the server based on the moving operation. After receiving the moving request, the server may obtain the target moving location included in the request, determine whether the target moving location is in the movable area, generate corresponding prompt information, and send the prompt information to the virtual reality terminal. That is, before receiving the movable area generated by the server, the virtual reality terminal receives the prompt information generated by the server based on the target location; and when the target location is not in the movable area, receives the first prompt information, where the first prompt information indicates that the target location is in the safe area of the another object and the first object is not allowed to move to the target location; or when the target location is in the movable area, receives the second prompt information, where the second prompt information indicates that the target location is not in the safe area of the another object and the first object is allowed to move to the target location.

A moving manner of the first object may be instantaneous moving or common moving. When performing instantaneous moving, the first object initiates an instantaneous moving operation. The instantaneous moving operation includes a target location of the first object for instantaneous moving. The virtual reality terminal may send the moving request to the server after detecting the instantaneous moving operation. The server may generate the movable area based on the received moving request, and determine the target location to generate prompt information. When determining that the target location is not in the movable area, the server generates the first prompt information, where the first prompt information may inform that the target location is in the safe area of the another object and the first object cannot instantaneously move to the target location. The server may return the first prompt information to the virtual reality terminal. The virtual reality terminal informs, based on the first prompt information, that the first object cannot instantaneously move to the target location. When determining that the target location is in the movable area, the server generates the second prompt information, where the second prompt information may inform that the target location is not in the safe area of the another object and the first object can instantaneously move to the target location. The server may send the second prompt information to the virtual reality terminal. The virtual reality terminal informs, based on the second prompt information, that the first object can instantaneously move to the target location, so that the first object completes the instantaneous moving.

When performing common moving, the first object initiates a common moving operation. The common moving operation includes a target location of the first object for moving. The virtual reality terminal sends the moving request to the server after detecting the common moving operation. The server generates the movable area based on the received moving request, and determines the target location to generate prompt information. When determining that the target location is not in the movable area, the server generates the first prompt information, where the first prompt information may inform that the target location is in the safe area of the another object and the first object cannot move to the target location. The server may return the first prompt information to the virtual reality terminal. The virtual reality terminal informs, based on the first prompt information, that the first object cannot move to the target location. When determining that the target location is in the movable area, the server generates the second prompt information, where the second prompt information may inform that the target location is not in the safe area of the another object and the first object can move to the target location. In addition, the server may plan a moving route based on the target location and the movable area, and send the second prompt information and the moving route to the virtual reality terminal. The virtual reality terminal informs that the first object can move to the target location, so that the first object moves to the target location based on the route.

When the location of the first object moves, the virtual reality terminal obtains both location information of the first object and the another object, and determines whether the first object has moved to the safe area of the another object. If the first object has moved to the safe area of the another object, the virtual reality terminal sends a prompt to the first object to prompt the first object to leave the safe area of the another object. That is, the virtual-reality-based control apparatus may further include: an obtaining unit, configured to obtain a real-time location of the first object and a real-time location of the second object by using the virtual reality terminal after the virtual reality terminal prompts the first object with the movable area; and a fourth prompt unit, configured to: when the real-time location of the first object is in the safe area of the second object, prompt, by using the virtual reality terminal, the first object to leave an area in which the first object is located, where the safe area of the second object is determined based on the real-time location of the second object.

Referring back to FIG. 4, the first object is B, the second object is A, the safe distance is a safe distance that is set by A for B, and a circular area is a safe area of A for B. A location to which B moves is in the safe area of A. In this case, the virtual reality terminal obtains locations of A and B, and determines that B enters the safe area of A. Therefore, the virtual reality terminal sends a prompt to B to prompt B to leave the safe area of A, and does not stop sending the prompt to B until B has left the safe area of A.

There may be a plurality of objects in the scene in which the first object is located, each object has a respective safe area, and other objects than the object cannot move in the safe area. Therefore, the movable area of the first object does not include or overlap with a safe area of another object. A safe area of an object may be obtained based on a location of the object and a safe distance of the object for another object. Therefore, the first generation unit includes: an obtaining module, configured to: after the virtual reality terminal sends the moving request to the server based on the moving operation, obtain, by using the server, a safe distance of each object in the scene in which the first object is located; a generation module, configured to generate a safe area of each object by using the server based on the safe distance, where the safe area in two-dimensional space is a circular area, and the safe area in three-dimensional space is a spherical area; and a deletion module, configured to delete the safe area of each object from the current scene by using the server to obtain the movable area.

It may be understood that when the scene is two-dimensional space, a safe area of an object is a circular area with a location of the object as a center and a safe distance as a radius. When the scene is three-dimensional space, a safe area of an object is a spherical area with a location of the object as a sphere center and a safe distance as a sphere radius. The first object can move only in an area in the scene other than the safe area of the another object, that is, an area obtained by deleting the safe area of the another object from the scene is the safe area of the first object.

In this embodiment, the obtaining module includes an obtaining sub-module, configured to obtain a preset safe distance or a default safe distance of each object for the first object by using the server, where the preset safe distance is obtained by each object based on an association relationship between the object and the first object.

It may be understood that when the safe area of the another object for the first object is calculated, the safe distance is a safe distance that is set by the another object for the first object. Safe distances that are set by different objects for the first object may be set based on association relationships between the different objects and the first object. The association relationship may be a close-or-distant relationship. When an object has a close relationship with the first object, the object may set a safe distance to a relatively small value. When an object has a distant relationship with the first object, the object may set a safe distance to a relatively large value. For example, if a relationship between an object A and the first object is a relationship that is relatively close (e.g., a friend relationship), a safe distance of the object A for the first object may be set to a relatively small value, for example, may be set to one unit length. If a relationship between an object B and the first object is a relationship that is relatively distant (e.g., an enemy relationship), a safe distance of the object B for the first object may be set to a relatively large value, for example, may be set to three unit lengths. If a relationship between an object C and the first object and a relationship between an object D and the first object are common relationships, a safe distance of the object C for the first object and a safe distance between the object D for the first object do not need to be particularly set and are two unit lengths by default.

In this embodiment, locations of all objects are stored in the server in advance. When the locations of the objects change in the scene, the virtual-reality-based control apparatus may control such that the locations of all the objects stored in the server are the same as locations of the objects in the scene, so as to ensure accuracy of the locations of the objects stored in the server, the virtual-reality-based control apparatus may further include: a second sending unit, configured to send a location synchronization request to the server by using the virtual reality terminal when a location changes, where the server updates the stored location of the virtual reality terminal based on the location synchronization request; and a fourth receiving unit, configured to receive, by using the virtual reality terminal, a location synchronization notification sent by the server, where the location synchronization notification includes a location of each object in the scene in which the first object is located.

The server may obtain the movable area of the first object by deleting the safe area of the another object from an area of the scene. The locations of all the objects are stored in the server in advance, and when a location of an object changes, the server performs location synchronization on the object to update the current location of the object. For example, the server stores location information of all the objects in the scene (where an object is associated with a virtual reality terminal, and location information of the object is location information of the virtual reality terminal associated with the object). After the first object moves, the location of the first object changes, and the virtual reality terminal associated with the first object sends the location synchronization request to the server to request the server to update the original location of the first object based on a location to which the first object moves. After receiving the synchronization request, the server updates the location of the first object based on the location to which the first object moves, and sends a location update notification to the first object. The location update notification includes an updated location of the first object, and further includes locations of all other objects in the scene. In addition, the server may further send the location update notification of the first object to the other objects in the scene.

Referring back to FIG. 5, in an exemplary embodiment, the server may be a synchronization server. Locations of a virtual reality terminal A and a virtual reality terminal B are stored in the synchronization server in advance. The virtual reality terminal A is associated with an object A, and the virtual reality terminal B is associated with an object B. Here, the object A may correspond to the first object described above with reference to the foregoing embodiments. When a location of the object A changes, requesting the server for location synchronization mainly includes the following steps:

1. Request user location synchronization. After the object A moves, the location of the object A changes. The virtual reality terminal A detects that the location of the object A changes, obtains a changed location of the object A, and sends a location synchronization request to the synchronization server to request location synchronization.

2. Confirm the synchronization request and synchronize all user locations. The synchronization server updates the location of the object A based on location synchronization request, sends an update notification to the virtual reality terminal, and confirms the synchronization request. The update notification includes an updated location of the object A, and further includes a location of the object B in a scene in which the object A is located. In addition, the synchronization server sends the location update notification of the object A to the virtual reality terminal B, and notifies the object B of the changed location of the object A.

In an implementation, the server may be a target virtual reality terminal in the current scene in which the first object is located. The target virtual reality terminal is a virtual reality terminal associated with any object in the scene, and the first sending unit includes a sending module, configured to send the moving request to the target virtual reality terminal by using the virtual reality terminal based on the moving operation.

Virtual reality terminals associated with all the objects in the scene are connected to form a network. A server may be independently set in the network, or a virtual reality terminal associated with any object in the network may be selected as the server. When a virtual reality terminal associated with an object in the network is used as the server, the virtual reality terminal is used as the target virtual reality terminal in the scene in which the first object is located. In this way, that the virtual reality terminal sends the moving request to the server is sending the moving request to the target virtual reality terminal.

In the embodiments, the moving operation initiated by the first object is detected by using the virtual reality terminal, the moving request is sent to the server based on the moving operation, the movable area generated by the server based on the moving request and a location of another object in the scene in which the first object is located is received, and the movable location is prompted to the first object, so that the first object moves based on the prompt, thereby achieving an objective that the first object moves in the movable area in the scene. The movable area does not include or overlap with a safe area of the another object in the scene. Therefore, when moving in the movable are, the first object does not move to the safe area of the another object in the scene, so as to achieve the technical effect that in a virtual-reality system, the first object moves based on the location of the another object in the current scene, thereby solving a technical problem that in the virtual-reality system, the first object interferes with the another object due to that the first object moves to the safe area of the another object and therefore is excessively close to the another object in the scene.

Figure 9:
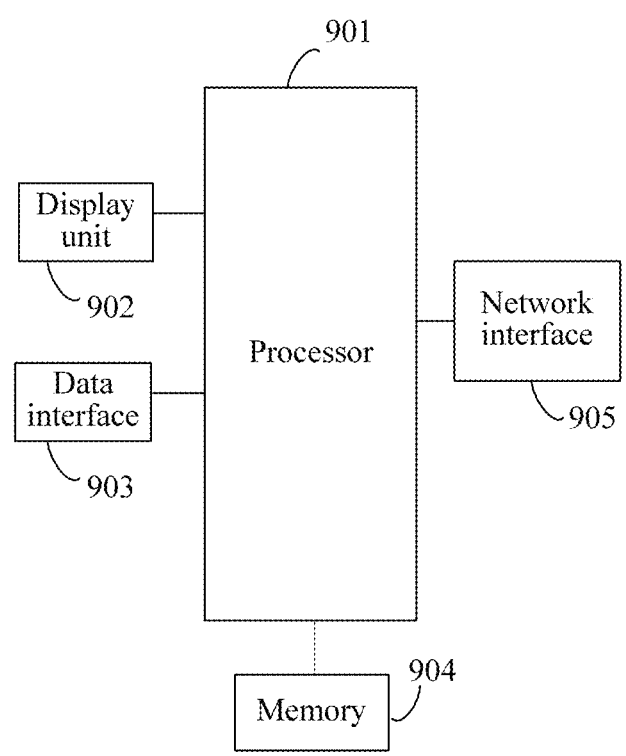
FIG. 9 is a schematic diagram of a terminal according to an embodiment.

According to an embodiment, a terminal configured to implement the forgoing virtual-reality-based control method is further provided. FIG. 9 is a schematic diagram of a terminal according to an embodiment. As shown in FIG. 9, the terminal mainly includes a processor 901, a display unit 902, a data interface 903, a memory 904, and a network interface 905.

The data interface 903 is mainly configured to transmit, to the processor 901 through data transmission, a moving request initiated by a first object and a target location selected by the first object for moving.

The memory 905 is mainly configured to store a movable location and location information of another object in a scene in which the first object is located that are received by the virtual reality terminal.

The network interface 906 is mainly configured to: perform network communication with a server, send the moving request, and perform location synchronization.

The display unit 903 is mainly configured to display the scene in which the first object is located and the another object in the scene.

The processor 901 is mainly configured to perform the following operations:

detecting, by the virtual reality terminal, a moving operation initiated by the first object; sending, by the virtual reality terminal, the moving request to the server based on the moving operation; receiving, by the virtual reality terminal, the movable area generated by the server based on the moving request, where the movable area does not include or overlap with a safe area of a second object, the safe area is an area in which the first object is not allowed to move, the second object is any object in the scene other than the first object, and the scene is the scene in which the first object is located; and prompting, by the virtual reality terminal, the first object with the movable area, so that the first object performs the moving operation based on the prompted movable area.

The processor 901 is further configured to: receive a location selection instruction sent by the first object, where the location selection instruction is used for indicating a target location selected by the first object for moving; determine whether the target location is in the movable area; and when determining that the target location is in the movable area, inform the first object that the first object can move to the target location; or when determining that the target location is not in the movable area, inform the first object that the first object cannot move to the target location.

The processor 901 is further configured to: receive first prompt information generated by the server based on the target location, where the first prompt information is used for indicating that the target location is in the safe area and inform that the first object is not allowed to move to the target location; or receive second prompt information generated by the server based on the target location, where the second prompt information is used for indicating that the target location is outside the safe area and inform that the first object is allowed to move to the target location.

The processor 901 is further configured to: obtain a real-time location of the first object and a real-time location of the second object; and when the real-time location of the first object is in the safe area of the second object, prompt the first object to leave an area in which the first object is located, where the safe area of the second object is determined based on the real-time location of the second object.

The processor 901 is further configured to: obtain a safe distance of each object in the scene in which the first object is located, where the object is an object in the scene other than the first object; generate a safe area of each object based on the safe distance, where the safe area in two-dimensional space is a circular area, and the safe area in three-dimensional space is a spherical area; and delete the safe area of each object from the scene to obtain the movable area.

The processor 901 is further configured to obtain a preset safe distance or a default safe distance of each object for the first object, where the preset safe distance is obtained by each object based on an association relationship between the object and the first object.

The processor 901 is further configured to: send a location synchronization request to the server when a location of the first object changes, so that the server updates the stored location of the first object based on the location synchronization request; and receive a location synchronization notification sent by the server, where the location synchronization notification includes a current location of each object in the scene in which the first object is located.

The processor 901 is further configured to send the moving request to a target virtual reality terminal based on the moving operation.

Correspondingly, for a specific example in this embodiment, refer to the examples described in the foregoing embodiment of the virtual-reality-based control method and the foregoing embodiment of the virtual-reality-based control apparatus, and details are not described in this embodiment again.

An embodiment further provides a storage medium. In this embodiment, the storage medium may be configured to store program code for the virtual-reality-based control method in the embodiments.

In this embodiment, the storage medium may be located in at least one of a plurality of network devices in a network such as a mobile communications network, a wide area network, a metropolitan area network, and/or a local area network.

In this embodiment, the storage medium is configured to store program code used for performing the following steps:

S1: A virtual reality terminal detects a moving operation initiated by a first object.

S2: The virtual reality terminal sends a moving request to a server based on the moving operation.

S3: The virtual reality terminal receives a movable area generated by the server based on the moving request, where the movable area does not include or overlap with a safe area of a second object, the safe area is an area in which the first object is not allowed to move, the second object is any object in a scene, and the scene is a scene in which the first object is located.

S4: The virtual reality terminal prompts the first object with the movable area, so that the first object performs the moving operation based on the prompted movable area.

In this embodiment, the storage medium may include, but is not limited to, a medium such as a USB flash drive, a read-only memory (ROM), a random access memory (RAM), a removable hard disk, a magnetic disk, and/or an optical disc that can store the program code.

In an exemplary embodiment, a processor receives, based on the program code stored in the storage medium, a location selection instruction sent by the first object, where the location selection instruction is used for indicating a target location selected by the first object for moving; determines whether the target location is in the movable area; and when determining that the target location is in the movable area, informs the first object that the first object can move to the target location; or when determining that the target location is not in the movable area, informs the first object that the first object cannot move to the target location.

In an exemplary embodiment, the processor receives, based on the program code stored in the storage medium, first prompt information generated by the server based on the target location, where the first prompt information is used for indicating that the target location is in the safe area and inform that the first object is not allowed to move to the target location; or receives second prompt information generated by the server based on the target location, where the second prompt information is used for indicating that the target location is outside the safe area and inform that the first object is allowed to move to the target location.

In an exemplary embodiment, the processor obtains, based on the program code stored in the storage medium, a real-time location of the first object and a real-time location of the second object; and when the real-time location of the first object is in the safe area of the second object, prompts the first object to leave an area in which the first object is currently located, where the safe area of the second object is determined based on the real-time location of the second object.

In an exemplary embodiment, the processor obtains, based on the program code stored in the storage medium, a safe distance of each object in the scene in which the first object is located, where the object is an object in the scene other than the first object; generates a safe area of each object based on the safe distance, where the safe area in two-dimensional space is a circular area, and the safe area in three-dimensional space is a spherical area; and deletes the safe area of each object from the scene to obtain the movable area.

In an exemplary embodiment, the processor obtains, based on the program code stored in the storage medium, a preset safe distance or a default safe distance of each object for the first object, where the preset safe distance is obtained by each object based on an association relationship between the object and the first object.

In an exemplary embodiment, the processor sends, based on the program code stored in the storage medium, a location synchronization request to the server when a location of the first object changes, so that the server updates the stored location of the first object based on the location synchronization request; and receives a location synchronization notification sent by the server, where the location synchronization notification includes a location of each object in the scene in which the first object is located.

In an exemplary embodiment, the processor sends, based on the program code stored in the storage medium, the moving request to a target virtual reality terminal based on the moving operation.

For more details regarding exemplary embodiments, refer to the examples described in the foregoing embodiments of the virtual-reality-based control method and the virtual-reality-based control apparatus, and details are not described herein again.

An embodiment further provides a computer program product including instructions, the instructions, when run on a computer, causing the computer to perform the virtual-reality-based control method according to any implementation of the foregoing embodiments.

The sequence numbers of the preceding embodiments are merely for description purpose but do not indicate the preference of the embodiments.

When the integrated unit in the foregoing embodiment is implemented in the form of a software function unit and sold or used as an independent product, the integrated unit may be stored in the foregoing computer readable storage medium. Based on such an understanding, the technical solutions of the disclosure, or the part contributing to the existing technology, or all or some of the technical solutions may be presented in the form of a software product. The computer software product is stored in a storage medium, and includes several instructions for instructing one or more computer devices (which may be a personal computer, a server, a network device, or the like) to perform all or some of the steps of the methods described in the embodiments.

In the foregoing embodiments, the descriptions of the embodiments have their respective focuses. For a part that is not described in detail in an embodiment, refer to related descriptions in other embodiments.

In the several embodiments provided in the disclosure, it should be understood that the disclosed client may be implemented in other manners. The apparatus embodiments described above are merely exemplary. For example, the division of the units is merely the division of logic functions, and may use other division manners during actual implementation. For example, multiple units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical, mechanical, or of other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in the form of hardware, or may be implemented in the form of a software functional unit.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are exemplary implementations of the disclosure. It should be noted that a person of ordinary skill in the art may make certain improvements and polishing without departing from the principle of the disclosure and the improvements and polishing shall fall within the protection scope of the disclosure.

What is claimed is:

1. A virtual-reality-based control method performed by at least one processor of a virtual reality terminal, the method comprising:
   detecting, by the at least one processor, a moving instruction initiated by a first object located in a virtual reality scene, the moving instruction;
   transmitting, by the at least one processor, a moving request to a server based on the moving instruction;
   receiving, by the at least one processor, a movable area from the server in response to the moving request, wherein the movable area does not overlap with a safe area of a second object, the second object being an object other than the first object in the virtual reality scene and among a plurality of objects included in the virtual reality scene; and
   prompting, by the at least one processor, the first object to move within the movable area,
   wherein the receiving the movable area from the server is based on determining a safe area of each object included in a preset area, and deleting the safe area of each object included in the preset area from the virtual reality scene to obtain the movable area,
   wherein the method further comprises:
      displaying, by the at least one processor, the movable area, from which the safe area of each object included in the preset area is deleted, on the virtual reality scene,
      in response to the first object selecting a target location, determining, by the at least one processor, whether the target location is in the movable area,
      in response to determining that the target location is not in the movable area, sending, by the at least one processor, a prompt to the first object that the first object cannot move to the target location, and
      in response to determining that the target location is within the movable area, performing, by the at least one processor, moving operation of the first object to the target location, wherein when the moving operation includes a location moving process from a current location of the first object to the target location, a moving route is automatically planned based on the movable area and displayed, and
   wherein the movable area is received with respect to only the second object, among the plurality of objects, that is located in the preset area in the virtual reality scene.

2. The method according to claim 1, the method further comprising:
   receiving from the server, by the at least one processor, information regarding whether the target location is in the safe area of the second object to which the first object is not allowed to move.

3. The method according to claim 1, further comprising:
   obtaining, by the at least one processor, a real-time location of the first object and a real-time location of the second object; and
   in response to determining that the real-time location of the first object is in the safe area of the second object, prompting, by the at least one processor, the first object to leave an area in which the first object is currently located, wherein the safe area of the second object is determined based on the real-time location of the second object.

4. The method according to claim 1, wherein
   the safe area of the second object is a circular area in two-dimensional space of the virtual reality scene, and
   the safe area is a spherical area in three-dimensional space of the virtual reality scene.

5. The method according to claim 4, wherein the circular area or the spherical area of the second object is based on a safe distance of the second object, the safe distance being set for the second object based on an association relationship between the first object and the second object.

6. The method according to claim 1, further comprising:
   transmitting, by the at least one processor, a location synchronization request to the server in response to a change of a location of the first object in the virtual reality scene; and
   receiving from the server, by the at least one processor, a location synchronization notification indicating that the location of the first object stored in the server has been updated to the changed location of the first object.

7. The method according to claim 1, wherein the server is a target virtual reality terminal associated with the second object in the virtual reality scene in which the first object is located, and the transmitting the moving request comprises transmitting, by the at least one processor of the virtual reality terminal, the moving request to the target virtual reality terminal based on the moving instruction.

8. A virtual-reality-based control apparatus, comprising:
   at least one memory operable to store program code; and
   at least one processor operable to access said at least one memory, read said program code, and operate according to said program code, said program code comprising:
      detection code configured to cause the at least one processor to detect a moving instruction initiated by a first object located in a virtual reality scene;
      first transmitting code configured to cause the at least one processor to transmit a moving request to a server based on the moving instruction;
      first receiving code configured to cause the at least one processor to receive a movable area from the server in response to the moving request, wherein the movable area does not overlap with a safe area of a second object, the second object being an object other than the first object in the virtual reality scene and among a plurality of objects included in the virtual reality scene; and
      first prompt code configured to cause the at least one processor to prompt the first object to move within the movable area,
   wherein receiving the movable area from the server is based on determining a safe area of each object included in a preset area, and deleting the safe area of each object included in the preset area from the virtual reality scene to obtain the movable area, wherein the program code further comprises:
code configured to cause the at least one processor to display the movable area, from which the safe area of each object included in the preset area is deleted, on the virtual reality scene,
configured to cause the at least one processor to, in response to the first object selecting the target location, determine whether the target location is in the movable area,
configured to cause the at least one processor to, in response to determining that the target location is not in the movable area, send a prompt to the first object that the first object cannot move to the target location, and
configured to cause the at least one processor to, in response to determining that the target location is within the movable area, performing moving operation of the first object to the target location, wherein when the moving operation includes a location moving process from a current location of the first object to the target location, a moving route is automatically planned based on the movable area and displayed, and
wherein the movable area is received only with respect to the second object, among the plurality of objects, that is located in the preset area in the virtual reality scene.

9. The apparatus according to claim 8, wherein the program code further comprises:
third receiving code configured to cause the at least one processor to receive information regarding whether the target location is in the safe area to which the first object is not allowed to move.

10. The apparatus according to claim 8, wherein the program code further comprises:
obtaining code configured to cause the at least one processor to obtain a real-time location of the first object and a real-time location of the second object; and
fourth prompt code configured to cause the at least one processor to, in response to determining that the real-time location of the first object is in the safe area of the second object, prompt the first object to leave an area in which the first object is currently located, wherein the safe area of the second object is determined based on the real-time location of the second object.

11. The apparatus according to claim 8, wherein the safe area of the second object is a circular area in two-dimensional space of the virtual reality scene, and the safe area is a spherical area in three-dimensional space of the virtual reality scene.

12. The apparatus according to claim 11, wherein the circular area or the spherical area of the second object is based on a safe distance of the second object, the safe distance being set for the second object based on an association relationship between the first object and the second object.

13. The apparatus according to claim 8, wherein the program code further comprises:
second transmitting code configured to the at least one processor to transmit a location synchronization request to the server in response to a change of a location of the first object in the virtual reality scene; and
fourth receiving code configured to the at least one processor to receive a location synchronization notification indicating that the location of the first object stored in the server has been updated to the changed location of the first object.

14. The apparatus according to claim 8, wherein the server is a target virtual reality terminal associated with the second object in the virtual reality scene in which the first object is located, and the first transmitting code further causes the at least one processor to transmit the moving request to the target virtual reality terminal based on the moving instruction.

15. A non-transitory computer readable storage medium storing instructions, the instructions, when run on a computer, causing the computer to:
detect a moving instruction initiated by a first object located in a virtual reality scene;
transmit a moving request to a server based on the moving instruction;
receive a movable area from the server in response to the moving request, wherein the movable area does not overlap with a safe area of a second object, the second object being an object other than the first object in the virtual reality scene and among a plurality of objects included in the virtual reality scene; and
prompt the first object to move within the movable area,
wherein receiving the movable area from the server is based on determining a safe area of each object included in a preset area, and deleting the safe area of each object included in the preset area from the virtual reality scene to obtain the movable area,
wherein the instructions further cause the computer to perform:
displaying the movable area, from which the safe area of each object included in the preset area is deleted, on the virtual reality scene,
in response to the first object selecting the target location, determining whether the target location is in the movable area,
in response to determining that the target location is not in the movable area, sending a prompt to the first object that the first object cannot move to the target location, and
in response to determining that the target location is within the movable area, performing moving operation of the first object to the target location, wherein when the moving operation includes a location moving process from a current location of the first object to the target location, a moving route is automatically planned based on the movable area and displayed, and
wherein the movable area is received only with respect to the second object, among the plurality of objects, that is located in the preset area in the virtual reality scene.

16. The non-transitory computer readable storage medium according to claim 15, wherein the safe area of the second object being a circular area in two-dimensional space of the virtual reality scene, and the safe area being a spherical area in three-dimensional space of the virtual reality scene.

17. The non-transitory computer readable storage medium according to claim 16, wherein the circular area or the spherical area of the second object is based on a safe distance of the second object, the safe distance being set for the second object based on an association relationship between the first object and the second object.

* * * * *